(12) United States Patent
Stratakos et al.

(10) Patent No.: US 6,271,651 B1
(45) Date of Patent: Aug. 7, 2001

(54) INDUCTOR SHORTING SWITCH FOR A SWITCHING VOLTAGE REGULATOR

(75) Inventors: Anthony J. Stratakos, Fremont; Marco A. Zuniga, Dublin, both of CA (US)

(73) Assignee: Volterra Semiconductor Corporation, Fremont, CA (US)

(*) Notice: Subject to any disclaimer, the term of this patent is extended or adjusted under 35 U.S.C. 154(b) by 0 days.

(21) Appl. No.: 09/556,021

(22) Filed: Apr. 20, 2000

(51) Int. Cl.[7] .................................................. G05F 1/40
(52) U.S. Cl. ............................................................ 323/282
(58) Field of Search ..................... 323/282, 283, 323/351

(56) References Cited

U.S. PATENT DOCUMENTS

| | | | |
|---|---|---|---|
| 5,422,562 | 6/1995 | Mammano et al. | 323/282 |
| 5,479,089 | * 12/1995 | Lee | 323/283 |
| 6,051,963 | * 4/2000 | Eagar | 323/282 |

* cited by examiner

*Primary Examiner*—Adolf Deneke Berhane
(74) *Attorney, Agent, or Firm*—Fish & Richardson P.C.

(57) ABSTRACT

A switching regulator has first, second, third and fourth terminals. The switching regulator includes a power switch, a rectifier switch, a filter, a shorting switch and a controller operable in a plurality of modes to open and close the switches. The power switch is disposed between the first terminal and a first node, and the rectifier switch is disposed between the first node and a second node coupling the second and fourth terminals. An inductor is disposed between the first node and the third terminal. One or more shorting switches can be connected in parallel with the inductor.

31 Claims, 4 Drawing Sheets

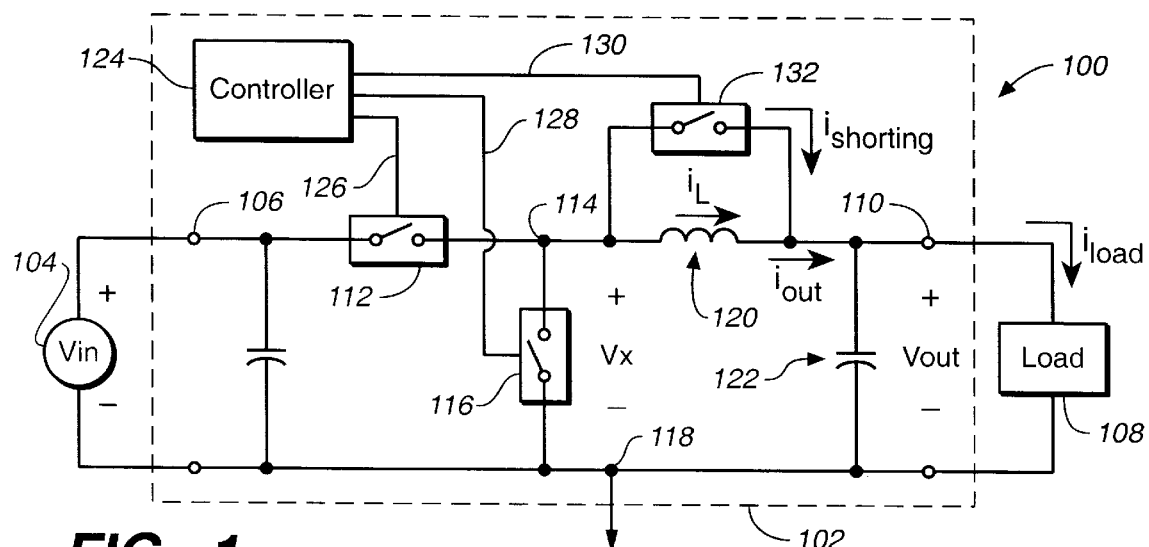
FIG._1
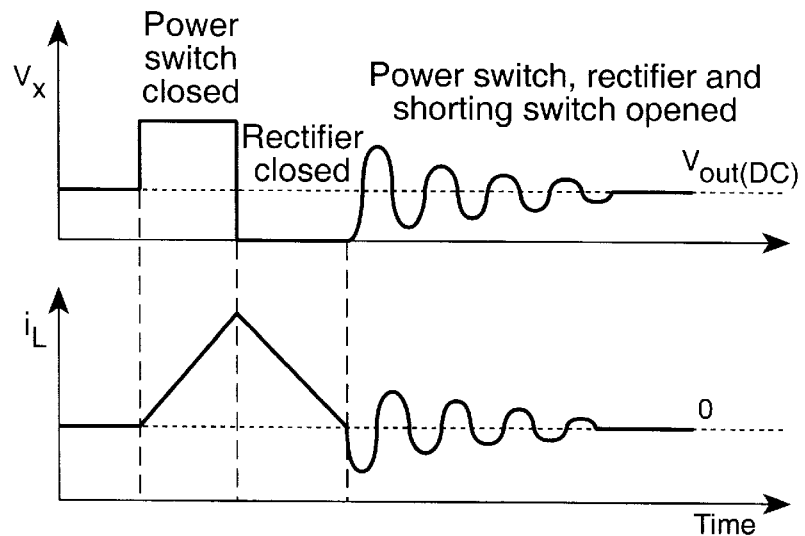
FIG._6a
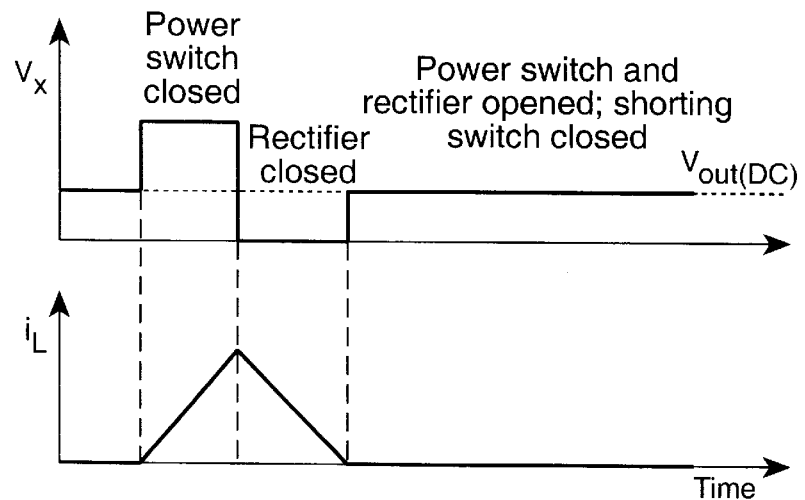
FIG._6b

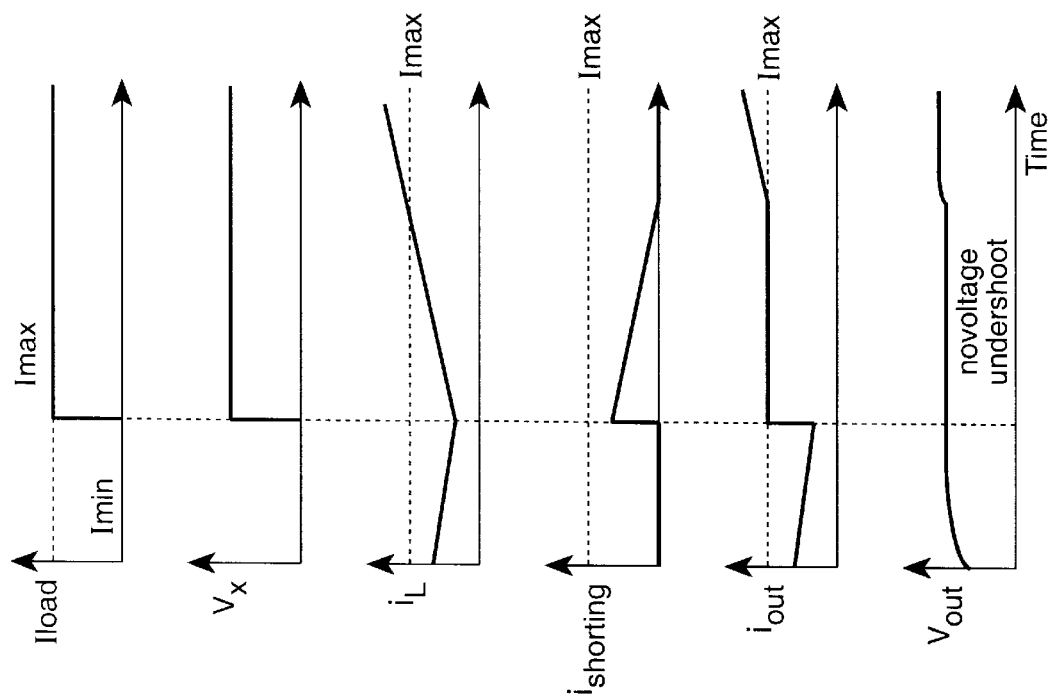
FIG._2b
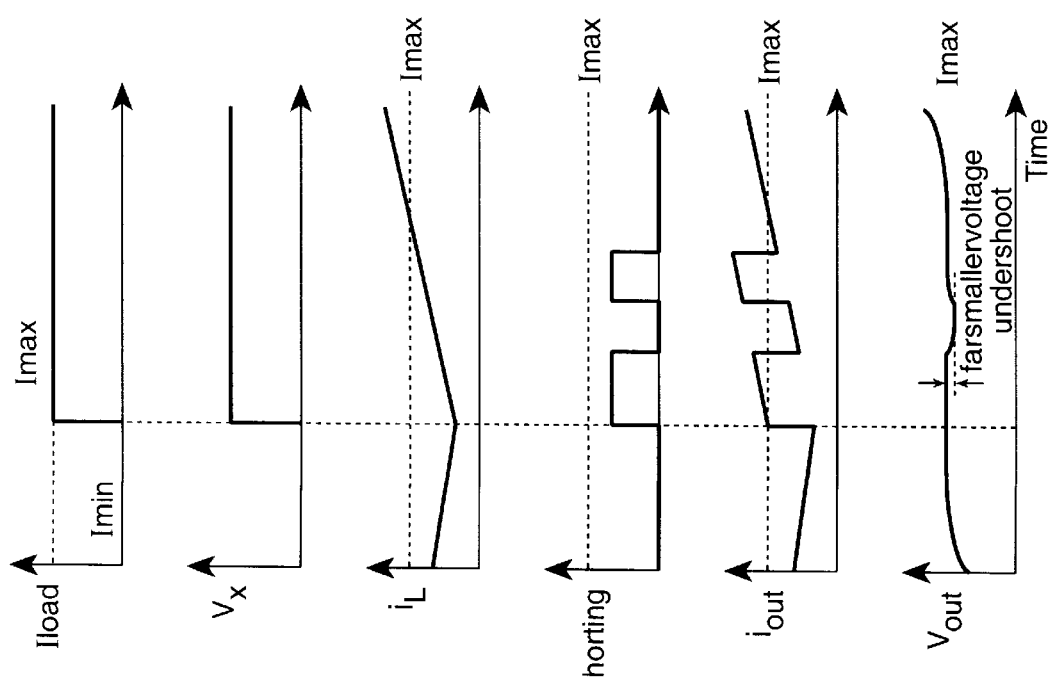
FIG._2a

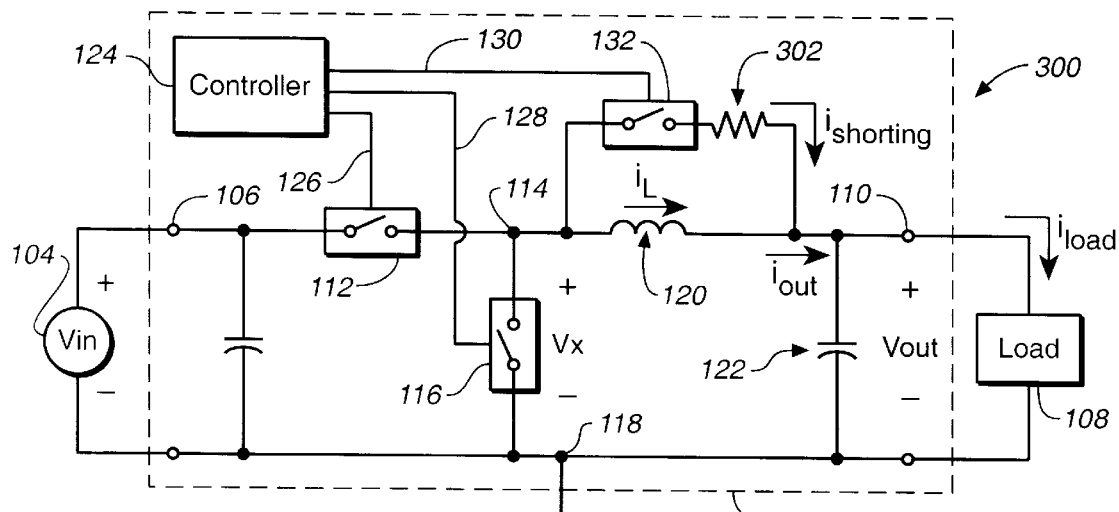
FIG._3
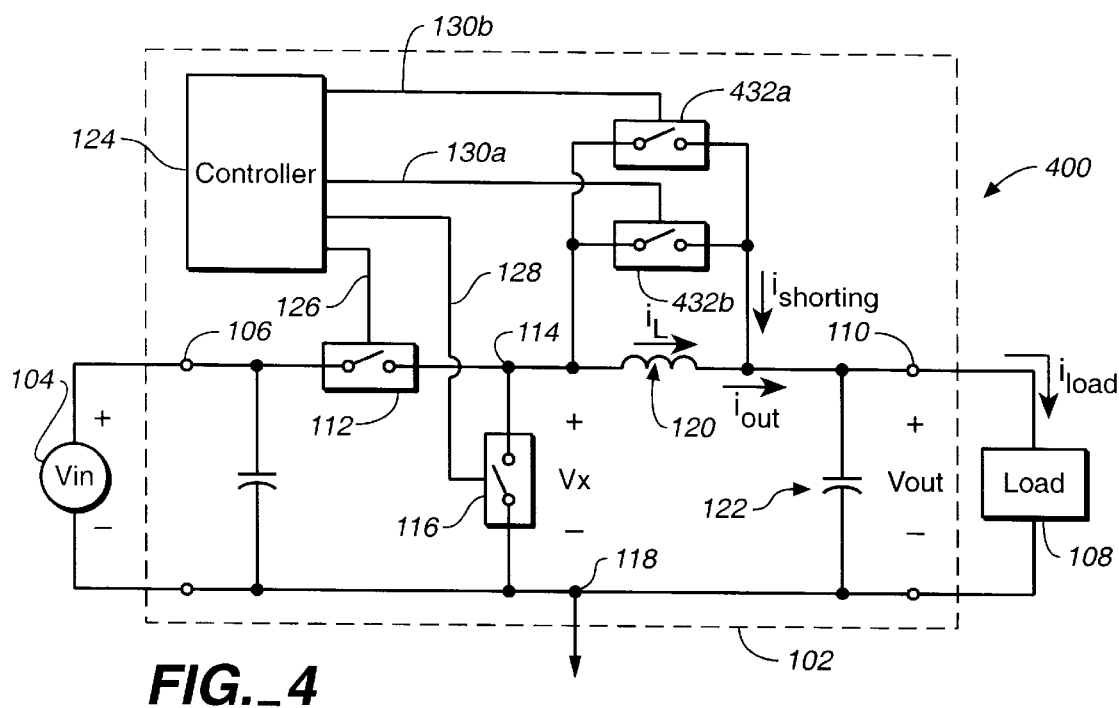
FIG._4

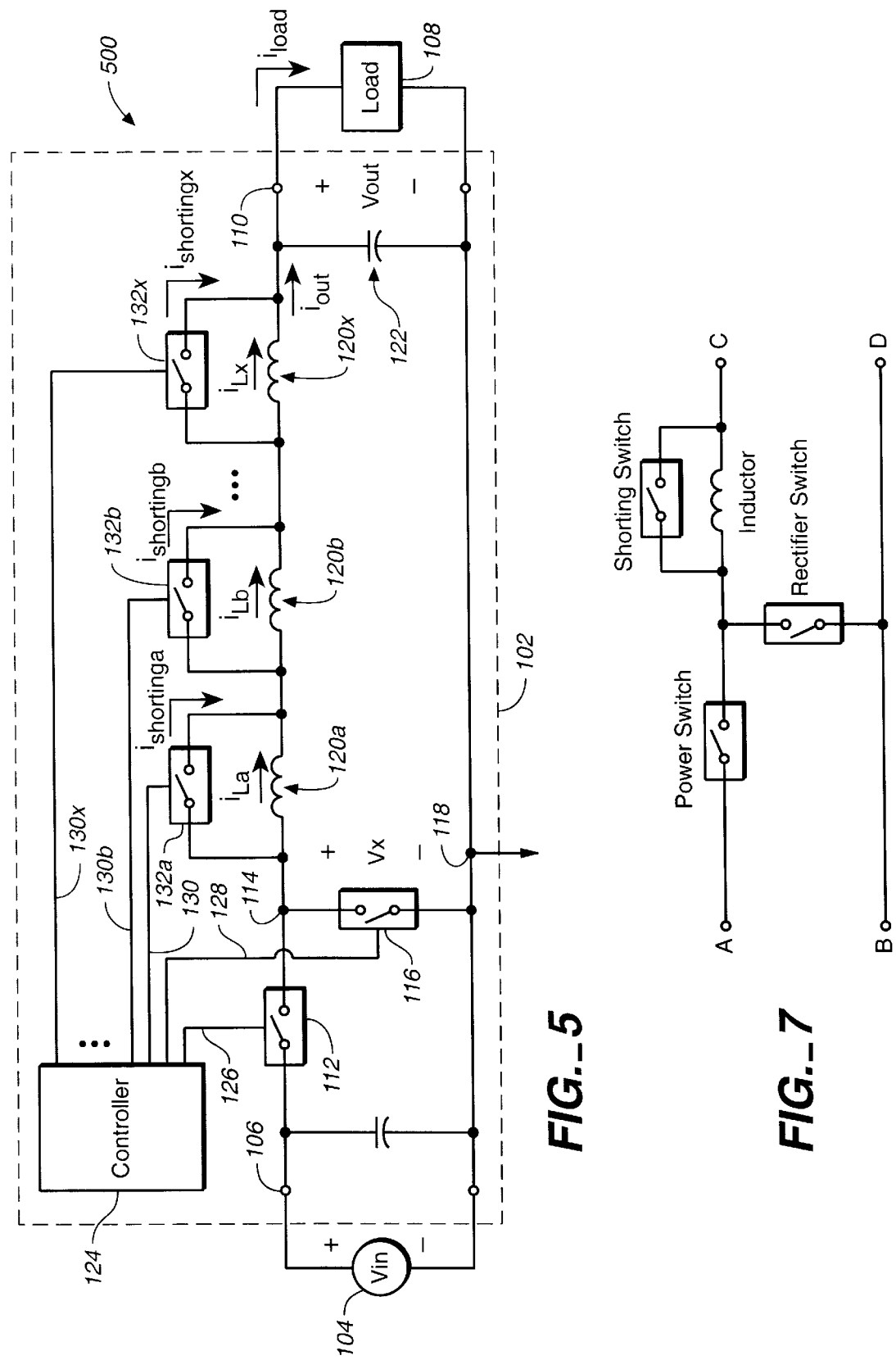
*FIG._5*
*FIG._7*

INDUCTOR SHORTING SWITCH FOR A SWITCHING VOLTAGE REGULATOR

BACKGROUND

The present invention relates to voltage regulators.

Voltage regulators, such as DC-to-DC converters, are used to provide stable voltage sources for electronic systems. Efficient DC-to-DC converters are particularly needed for battery management in low power devices, such as laptop computers and mobile phones. Switching voltage regulators (or simply "switching regulators") are known to be an efficient type of DC-to-DC converter. A switching regulator generates an output voltage by converting an input DC voltage into a high frequency voltage, and filtering the high frequency voltage to generate the output DC voltage.

Conventional switching regulators include two switches. One switch is used to alternately couple and decouple an unregulated input DC voltage source, such as a battery, to a load, such as an integrated circuit. The other switch is used to alternately couple and decouple the load to ground. An output filter, typically including an inductor and an output capacitor, is coupled between the input voltage source and the load to filter the output of the switches and produce the output DC voltage. In low power application, there is typically also a discontinuous mode of operation where both switches are open, so that the output filter is not actively driven. In this case, the input and output terminals of the filter will resonate at a high frequency until equilibrium is reached. The high frequency component in the inductor current and the filter input voltage can conduct and radiate to nearby noise sensitive circuits, causing degradation in the performance of those circuits.

SUMMARY

In one aspect, the invention is directed to a switching cell having first, second, third and fourth terminals. The switching cell includes an inductor disposed between a first node and the third terminal, a power switch disposed between the first terminal and the first node, a rectifier switch disposed between the first node and a second node, the second node coupling the second and fourth terminals, and a shorting switch connected in parallel with the inductor.

Implementations of the invention may include the following. The power switch may be a transistor. The rectifier switch may be a transistor or a diode. The shorting switch may be a transistor, a variable current source or a variable resistor. The switching cell may include a resistor connected in series with the shorting switch or a current source connected in series with the shorting switch.

In another aspect, the invention is directed to a switching regulator having first, second, third and fourth terminals. The switching regulator includes a power switch disposed between the first terminal and a first node, a rectifier switch disposed between the first node and a second node, the second node coupling the second and fourth terminals, a filter including an inductor and a capacitor, the inductor being disposed between the first node and the third terminal, and the capacitor being disposed between the third and fourth terminals, a shorting switch connected in parallel with the inductor, and a controller operable in a plurality of modes to open and close the power switch, the rectifier switch and the shorting switch.

Implementations of the invention may include the following. The plurality of modes may include a first mode in which the shorting switch and rectifier switch are open and the power switch is closed and a second mode in which the shorting switch and the power switch are open and the rectifier switch is closed. The controller may be configured to alternate between the first and second modes in response to a substantially constant load. The plurality of modes may include a third mode in which the power switch and the shorting switch are closed and the rectifier switch is open, and wherein the controller is configured to switch to the third mode to respond to a positive-going load step. The controller may be configured to alternately open and close the shorting switch to control the average amount of current flowing through the shorting switch. The controller may be configured to modulate an impedance of the shorting switch to vary the amount of current flowing through the shorting switch. The plurality of modes may include a fourth mode in which the rectifier switch and the shorting switch are closed and the power switch is open. The controller may be configured to switch to the fourth mode to respond to a negative-going load step. The controller may be configured to alternately open and close the shorting switch to control the average amount of current flowing through the shorting switch. The controller may be configured to modulate an impedance of the shorting switch to vary the amount of current flowing through the shorting switch. The plurality of modes may include a fifth mode in which the power switch and the rectifier switch are open and the shorting switch is closed, and wherein the controller is configured to switch to the fifth mode when current passing through the inductor reaches zero.

The first terminal may be coupled to a voltage source, the third terminal may be coupled to a load, and the second and fourth terminals may be coupled to electrical ground, such that the switching regulator is part of a buck converter circuit. The third terminal may be coupled to a voltage source, the first terminal may be coupled to a load, and the second and fourth terminals may be coupled to electrical ground, such that the switching regulator is part of a boost converter circuit. The first terminal may be coupled to a voltage source, the fourth terminal may be coupled to a load, and the second and third terminals may be coupled to electrical ground, such that the switching regulator is part of a buck-boost converter circuit. The switching regulator may include a plurality of shorting switches connected in parallel with the inductor.

The power switch, the rectifier switch and the shorting switch may be fabricated on different chips, or alternatively, on a single chip. Any or all of the switches may be implemented as discrete components. The switching regulator may include a resistor connected in series with the shorting switch. The shorting switch and the resistor switch may be fabricated on different chips, or alternatively, on a single chip. The inductor may be one of a plurality of inductors disposed between the first node and the third terminal. There may be individually controlled shorting switches in parallel with each inductor.

In another aspect, the invention is directed to an electronic device. The electronic device includes a switching cell having a power switch, a rectifier switch, a shorting switch, an inductor and four terminals, wherein one of the four terminals is to be connected to a voltage source, another of the four terminals is to be connected to a load, and the remaining two terminals are to be connected to ground, a voltage source, a load, and a controller operable in a plurality of modes to open and close the power switch, the rectifier switch and the shorting switch.

Advantages that can be seen in implementations of the invention include one or more of the following. The invention provides a shorting switch connected in parallel with the inductor. Driving a shorting switch in conjunction with the power switch and the rectifier switch: (a) provides an inductor-bypass that can improve the transient response of a circuit; and (b) eliminates the high frequency ringing during discontinuous mode. The invention allows for the use of an event-based simulation engine rather than a time-stepped simulation engine, which can significantly reduce the simulation time of the circuit under test during the design process.

The details of one or more embodiments of the invention are set forth in the accompanying drawings and the description below. Other features and advantages of the invention will become apparent from the description, the drawings, and the claims.

BRIEF DESCRIPTION OF DRAWINGS

FIG. 1 shows a three-switch buck converter circuit in which a switching regulator includes a power switch, a rectifier switch, and a shorting switch.

FIG. 2a is a timing diagram showing a positive-going load step response of the three-switch buck converter circuit of FIG. 1, where the shorting switch is alternately opened and closed to control the average current $i_{shorting}$ flowing through the shorting switch.

FIG. 2b is a timing diagram showing a positive-going load step response of the three-switch buck converter circuit of FIG. 1, where the control of the shorting switch is modulated to provide a variable current $i_{shorting}$.

FIG. 3 shows a three-switch buck converter circuit in which the switching regulator includes a resistor connected in series with the shorting switch.

FIG. 4 shows a three-switch buck converter circuit in which the switching regulator has two shorting switches connected in parallel with the inductor.

FIG. 5 shows a three-switch buck converter circuit in which the switching regulator has multiple series-connected inductors, each inductor having a shorting switch connected in parallel.

FIG. 6a shows the steady-state operating waveforms of the circuit of FIG. 1 in discontinuous-mode operation when the shorting switch is open.

FIG. 6b shows the steady-state operating waveforms of the circuit of FIG. 1 in discontinuous-mode operation when the shorting switch is closed.

FIG. 7 shows a switching cell including a power switch, a rectifier switch, and a shorting switch.

Like reference numbers and designations in the various drawings indicate like elements.

DETAILED DESCRIPTION

In a three-switch buck-converter circuit 100 shown in FIG. 1, a switching regulator 102 is coupled to a DC input voltage source 104, such as a battery, by an input terminal 106. The switching regulator 102 is also coupled to a load 108, such as an integrated circuit, by an output terminal 110. The switching regulator 102 serves as a DC-to-DC converter between the input terminal 106 and the output terminal 110.

The switching regulator 102 includes a power switch 112, such as a transistor, which alternately couples and decouples the input terminal 106 to an intermediate terminal or node 114. The switching regulator 102 includes a rectifier snitch 116, such as a transistor or a diode, which alternately couples and decouples the intermediate terminal 114 to ground 118.

Specifically, the power switch 112 may be a P-type MOS (PMOS) device having a source connected to the input terminal 106 and a drain connected to the intermediate terminal 114. The rectifier switch 116 may be an N-type MOS (NMOS) device having a source connected to ground 118 and a drain connected to the intermediate terminal 114.

The switching regulator 102 includes a controller 124 for controlling the operation of the power switch 112 and the rectifier switch 116. The controller 124 can be implemented using circuitry, software, or a combination of both. A first control line 126 connects the power switch 112 to the controller, and a second control line 128 connects the rectifier switch 116 to the controller. The controller 124 can be configured to alternately close the power switch 112 and the rectifier switch 116, such that an intermediate voltage $V_x$ having a rectangular waveform is generated at the intermediate terminal 114. Although the intermediate voltage $V_x$ may have a DC component, its pulsating nature makes it unsuitable as a DC source for the load 108 coupled to the output terminal 110.

A filter can be used to reduce the magnitude of the intermediate voltage $V_x$. In one implementation, the filter includes an inductor 120 and an output capacitor $C_{out}$ 122. The filter is configured to convert the rectangular waveform of the intermediate voltage $V_x$ at the intermediate terminal 114 into a substantially DC output voltage $V_{out}$ at the load 108.

Typically, when a conventional two-switch buck converter circuit responds to a load step, voltage undershoot or overshoot occurs. One such circuit is described in U.S. Pat. No. 6,020,729, which is incorporated herein by reference. To reduce the voltage undershoot or overshoot, a shorting switch 132 can be connected in parallel with the inductor 120. The shorting switch 132 can be a transistor—a P-type (PMOS) device, for example—having a source connected to the intermediate terminal 114 and a drain connected to the output terminal 110. The controller 124 in the switching regulator 102 can be configured to control the operation of the shorting switch 132 through a third control line 130.

The controller 124 can be configured to close both the power switch 112 and the shorting switch 132 to respond to a positive-going load step. In one implementation, the switching regulator 102 includes a voltage comparator coupled to the output terminal that triggers the controller 124 to close the shorting switch 132 when the output voltage $V_{out}$ falls below a desired voltage by a pre-defined amount. Referring to FIG. 2a, closing the shorting switch 132 provides an alternative path for current to flow from the input voltage source 104 to the load 108. The amount of current $i_{shorting}$ that can flow through the shorting switch 132 is governed by:

$$i_{shorting} = \frac{V_{in} - V_{out}}{R_{power} + R_{shorting}}$$

where $R_{power}$ and $R_{shorting}$ are the on-resistance of the power switch 112 and the shorting switch 132, respectively. This results in a nearly instantaneous jump in the output current $i_{out}$ by an amount equal to the shorting current $i_{shorting}$. Current $i_L$ slews through the inductor 120 at the rate of:

$$\frac{di_L}{dt} = \frac{V_{in} - i_{out} \cdot R_{power} - V_{out}}{L}$$

resulting in the current $i_{out}$ delivered to the output capacitor $C_{out}$ 122 and the load 108 being:

$$i_{out} = i_{shorting} + i_L$$

Similarly, the controller 124 can be configured to close both the rectifier switch 116 and the shorting switch 132 to respond to a negative-going load step. Closing the shorting switch 132 provides an alternative path for current to discharge in parallel with the inductor 120. The amount of current $i_{shorting}$ that can flow through the shorting switch 132 is governed by:

$$i_{shorting} = \frac{-V_{out}}{R_{rectifier} + R_{shorting}}$$

where $R_{rectifier}$ and $R_{shorting}$ are the on-resistances of the rectifier switch 116 and the shorting switch 132. This results in a nearly instantaneous drop in the output current $i_{out}$ by an amount equal to the shorting current $i_{shorting}$. Current $i_L$ slews through the inductor 120 at the rate of:

$$\frac{di_L}{dt} = \frac{-i_{out} \cdot R_{rectifier} - V_{out}}{L}$$

resulting in the current $i_{out}$ delivered to the output capacitor $C_{out}$ 122 and the load 108 being:

$$i_{out} = i_{shorting} + i_L$$

In both the positive and negative-going load steps, the shorting switch 132 may be alternately opened and closed to couple and decouple the intermediate terminal 114 to the output terminal 110. This reduces the average value of the current $i_{shorting}$ and provides for a smaller output undershoot voltage in response to the positive-going load step, as shown in FIG. 2*a*, or alternatively, provides for a smaller output overshoot voltage in response to the negative-going load step (not shown).

The shorting switch 132 may be a variable resistor or a current source. In this implementation, the current $i_{shorting}$ may be varied to obtain the desired output current $i_{out}$. For example, the shorting switch 132 may be a MOSFET having a gate voltage that can be modulated to control the on-resistance of the shorting switch 132, thereby changing the value of the current $i_{shorting}$ and providing for a smaller, if not negligible, undershoot voltage (FIG. 2*b*), or overshoot voltage (not shown).

The shorting switch 132 may be selected such that its on-resistance provides the desired output current $i_{out}$. Alternatively, the shorting switch 132 may be selected to have a small on-resistance and a resistor 302 of the desired value may be coupled in series with the shorting switch 132 to provide the desired output current $i_{out}$, as shown in FIG. 3.

An alternative implementation of the three-switch buck converter circuit 400 is shown in FIG. 4. The switching regulator 402 includes two shorting switches 432*a* and 432*b* connected in parallel with the inductor 120. The shorting switches 432*a* and 432*b* are connected to the controller by control lines 130*a* and 130*b*, respectively. The shorting switches 432*a* and 432*b* serve as controlled switches for alternately coupling and decoupling the intermediate terminal 114 to the output terminal 110. In this implementation, to respond to a positive-going load step, the power switch 112 and the shorting switch 432*a* can be closed to short the output terminal 110 to the input terminal 106. Similarly, to respond to a negative-going load 108 step, the rectifier switch 116 and the shorting switch 432*b* can be closed to short the output terminal 110 to ground 118. In both the positive and negative-going load 108 steps, the shorting switches 432*a* and 432*b* may be selected such that the on-resistance of each of the shorting switches 432*a* and 432*b* provides the desired output current $i_{out}$. Alternatively, a current-limiting resistor may be coupled in series with the shorting switch 432*a*, the shorting switch 432*b*, both, or neither, to provide the desired output current $i_{out}$. The shorting switches 432*a* and 432*b* may be modulated to provide a variable resistance or a controllable sink and source current.

A third implementation of the three-switch buck converter circuit 500 is shown in FIG. 5. The switching regulator 102 has multiple series-connected inductors 120*a*, 120*b* . . . 120*x* disposed (i.e., located in a circuit path) between the intermediate terminal 114 and the output terminal 110. Each inductor 120*a*, 120*b* . . . 120*x* has a respective shorting switch 132*a*, 132*b* . . . 132*x* connected in parallel. In this implementation, converter efficiency, output voltage ripple, and large-signal dynamic response can be traded real-time by opening and closing different combinations of shorting switches 132*a*, 132*b* . . . 132*x*. For example, to obtain the highest efficiency and the lowest steady-state output voltage ripple, all of the shorting switches 132*a*, 132*b* . . . 132*x* can be opened, such that all of the inductors 120*a*, 120*b* . . . 120*x* are cascaded. With this configuration, the switching regulator 102 has the largest possible value of filter inductance. Similarly, in response to a load step, the effective inductance of the circuit may be reduced by shorting different combinations of inductors 120*a*, 120*b* . . . 120*x* to obtain a desired slew rate.

When the three-switch buck converter circuit of FIG. 1 is in discontinuous-mode operation (power switch 112, rectifier switch 114 and shorting switch 132 are open), a Cx-L-Cout resonant circuit is formed. Cx is the linearized parasitic capacitance of the intermediate terminal 114 and Cout is the capacitance of the output capacitor 122, where Cout>>Cx in any practical implementation. As shown in FIG. 6*a*, at the conclusion of the switching cycle with the shorting switch 132 and power switch 112 open, and the rectifier switch 114 opened (ideally with $i_L$=0), uncontrolled high frequency ringing of the $i_L$ and Vx waveforms will result. The ringing waveforms can conduct and radiate to nearby noise-sensitive circuits, possibly causing degradation in the performance of the nearby circuits. To eliminate the ringing of the $i_L$ and Vx waveforms, the shorting switch 132 can be closed to short the intermediate terminal 114 to the output terminal 110. In the implementation where the shorting switch 132 is selected such that its on-resistance is:

$$R_{shorting} = \sqrt{\frac{L}{C_x}}$$

where L is the value of the filter inductor 120, and the Cx-L-Cout resonant circuit is significantly damped to yield nearly ideal $i_L$ and Vx waveforms, as shown in FIG. 6*b*. In an alternative implementation, a resistor can be connected in series with the shorting switch 132 to provide the desired damping effect. In either implementation, the elimination of the interference problems resulting from the ringing waveforms results in fewer EMI and RFI-related printed circuit board design considerations.

The power switch 112, rectifier switch 116 and one or more shorting switches 132 can be fabricated on a single chip, or alternatively, on multiple chips. Any (or all) of the switches can be fabricated as discrete components to be placed on a circuit board. For example, the power switch 112 can be implemented on-chip while the rectifier switch 116 and the shorting switch 132 are implemented discretely. Similar parallel power trains can operate in a single phase or multiple phase mode. The switching regulator 102 can be implemented as a single chip solution in which the power switch 112, rectifier switch 116, one or more shorting switches 132 and the controller are fabricated on the same chip. Alternatively, the switching regulator 102 can be implemented as a multiple chip solution in which the power switch 112, rectifier switch 116 and one or more shorting switches 132 are fabricated on one chip and the controller is fabricated on another chip. In the implementation where a resistor is connected in series with the shorting switch 132, the resistor and the shorting switch 132 can be fabricated on the same chip.

The invention has been described in terms of particular embodiments. Other embodiments are within the scope of the following claims. For example, the steps of the invention can be performed in a different order and still achieve desirable results. Although the switching regulator is illustrated in a buck converter topology, the invention is also applicable to other switching regulator topologies, such as a boost converter topology or a buck-boost converter topology. Referring to the switching cell shown in FIG. 7, the three-switch boost-converter circuit can be implemented by coupling an input capacitor and a DC input voltage source (e.g., a battery) across terminals C and D, and coupling a load, such as an integrated circuit, across terminals A and B, so that the voltage across terminals A and B is greater than or equal to the voltage across terminals C and D. The three-switch buck-boost converter circuit can be implemented by connecting nodes B and C to a common potential, coupling an output filter capacitor and a load across node D and the common potential, and coupling a DC input voltage source across node A and the common potential. In the three-switch buck-boost converter circuit, the magnitude of the voltage at node D is less than or equal to the voltage an node A, but opposite in polarity.

What is claimed is:

1. A switching cell having first, second, third and fourth terminals, the switching cell comprising:
    an inductor disposed between a first node and the third terminal;
    a power switch disposed between the first terminal and the first node;
    a rectifier switch disposed between the first node and a second node, the second node coupling the second and fourth terminals; and
    a bi-directional shorting switch connected in parallel with the inductor and disposed between the first node and the third terminal.

2. The switching cell of claim 1, wherein the power switch is a transistor.

3. The switching cell of claim 1, wherein the rectifier switch is a transistor or a diode.

4. The switching cell of claim 1, wherein the shorting switch is a transistor, a variable current source or a variable resistor.

5. The switching cell of claim 1, further comprising a resistor connected in series with the shorting switch, and wherein the resistor and shorting switch are both disposed between the first node and the third terminal.

6. A switching regulator having first, second, third and fourth terminals, the switching regulator comprising:
    a power switch disposed between the first terminal and a first node;
    a rectifier switch disposed between the first node and a second node, the second node coupling the second and fourth terminals;
    a filter including an inductor and a capacitor, the inductor being disposed between the first node and the third terminal, and the capacitor being disposed between the third and fourth terminals;
    a bi-directional shorting switch connected in parallel with the inductor; and
    a controller operable in a plurality of modes to open and close the power switch, the rectifier switch and the shorting switch.

7. The switching regulator of claim 6, wherein the plurality of modes include a first mode in which the shorting switch and rectifier switch are open and the power switch is closed and a second mode in which the shorting switch and the power switch are open and the rectifier switch is closed, and the controller is configured to alternate between the first and second modes in response to a substantially constant load.

8. The switching regulator of claim 7, wherein the plurality of modes include a third mode in which the power switch and the shorting switch are closed and the rectifier switch is open, and wherein the controller is configured to switch to the third mode to respond to a positive-going load step.

9. The switching regulator of claim 8, wherein the controller is configured to alternately open and close the shorting switch to control the average amount of current flowing through the shorting switch.

10. The switching regulator of claim 8, wherein the controller is configured to modulate an impedance of the shorting switch to vary the amount of current flowing through the shorting switch.

11. The switching regulator of claim 7, wherein the plurality of modes include a fourth mode in which the rectifier switch and the shorting switch are closed and the power switch is open, and wherein the controller is configured to switch to the fourth mode to respond to a negative-going load step.

12. The switching regulator of claim 11, wherein the controller is configured to alternately open and close the shorting switch to control the average amount of current flowing through the shorting switch.

13. The switching regulator of claim 11, wherein the controller is configured to modulate an impedance of the shorting switch to vary the amount of current flowing through the shorting switch.

14. The switching regulator of claim 7, wherein the plurality of modes include a fifth mode in which the power switch and the rectifier switch are open and the shorting switch is closed, and wherein the controller is configured to switch to the fifth mode when current passing through the inductor reaches zero.

15. The switching regulator of claim 6, wherein the plurality of modes include:
    a first mode in which the controller opens the shorting switch and alternately opens and closes the power switch and the rectifier switch;
    a second mode in which the controller closes the power switch and the shorting switch and opens the rectifier switch;
    a third mode in which the controller closes the rectifier switch and the shorting switch and opens the power switch; and
    a fourth mode in which the controller opens the power switch and the rectifier switch and closes the shorting switch.

16. The switching regulator of claim 6, wherein:

the first terminal is to be coupled to a voltage source;

the third terminal is to be coupled to a load; and the second and fourth terminals are to be coupled to electrical ground, such that the switching regulator is part of a buck converter circuit.

17. The switching regulator of claim 6, wherein:

the third terminal is to be coupled to a voltage source;

the first terminal is to be coupled to a load; and the second and fourth terminals are to be coupled to electrical ground, such that the switching regulator is part of a boost converter circuit.

18. The switching regulator of claim 6, wherein:

the first terminal is to be coupled to a voltage source;

the fourth terminal is to be coupled to a load; and the second and third terminals are to be coupled to electrical ground, such that the switching regulator is part of a buck-boost converter circuit.

19. The switching regulator of claim 6, further comprising:

a second shorting switch connected in parallel with the inductor.

20. The switching regulator of claim 6, wherein:

the power switch, the rectifier switch and the shorting switch are fabricated on different chips.

21. The switching regulator of claim 6, wherein:

the power switch, the rectifier switch and the shorting switch are fabricated on a single chip.

22. The switching regulator of claim 6, further comprising:

a resistor connected in series with the shorting switch.

23. The switching regulator of claim 22, wherein:

the shorting switch and the resistor are fabricated on a single chip.

24. The switching regulator of claim 22, wherein:

the shorting switch and the resistor are fabricated on different chips.

25. The switching regulator of claim 6, wherein:

the inductor is one of a plurality of inductors disposed between the first node and the third terminal and wherein a shorting switch is connected in parallel with each inductor.

26. An electronic device, comprising:

a switching cell having a power switch, a rectifier switch, a bi-directional shorting switch, an inductor and four terminals, wherein one of the four terminals is to be connected to a voltage source, another of the four terminals is to be connected to a load, and the remaining two terminals are to be connected to ground;

a voltage source;

a load; and a controller operable in a plurality of modes to open and close the power switch, the rectifier switch and the shorting switch.

27. The switching regulator of claim 26, wherein the controller is configured to alternately open and close the shorting switch to control the average amount of current flowing through the shorting switch.

28. The switching regulator of claim 26, wherein the controller is configured to modulate an impedance of the shorting switch to vary the amount of current flowing through the shorting switch.

29. A switching cell having first, second, third and fourth terminals, the switching cell comprising:

an inductor disposed between a first node and the third terminal;

a power switch disposed between the first terminal and the first node;

a rectifier switch disposed between the first node and a second node, the second node coupling the second and fourth terminals; and a shorting switch connected in parallel with the inductor and disposed between the first node and the third terminal, wherein the shorting switch is configured to supply an on-resistance operable to optimize the resonance damping time constant of the switching cell.

30. The switching cell of claim 29, wherein the on-resistance is approximately equal to the square root of a quantity resulting from the value of the inductor divided by the linearized parasitic capacitance of the first node.

31. The switching cell of claim 29, wherein the on-resistance of the shorting switch is primarily supplied by a resistive element coupled to the shorting switch.

* * * * *